US006341178B1

(12) United States Patent
Parker

(10) Patent No.: US 6,341,178 B1
(45) Date of Patent: Jan. 22, 2002

(54) METHOD AND APPARATUS FOR LOSSLESS PRECOMPRESSION OF BINARY IMAGES

(75) Inventor: James D. Parker, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 894 days.

(21) Appl. No.: 08/566,987

(22) Filed: Dec. 4, 1995

(51) Int. Cl.[7] .............................. G06K 9/36; G06K 9/46
(52) U.S. Cl. ....................................... 382/243; 358/433
(58) Field of Search ................................ 382/166, 173, 382/176, 244, 245, 232, 180, 282, 283, 243; 358/433, 455; 348/420, 420.1

(56) References Cited

U.S. PATENT DOCUMENTS

| | | | | |
|---|---|---|---|---|
| 4,484,081 A | * | 11/1984 | Cornyn, Jr. et al. | 348/129 |
| 4,785,349 A | * | 11/1988 | Keith et al. | 348/390 |
| 4,799,173 A | * | 1/1989 | Rose et al. | 345/126 |
| 4,999,715 A | * | 3/1991 | Porcellio et al. | 358/433 |
| 5,144,682 A | | 9/1992 | Nakamura | 382/9 |
| 5,163,104 A | * | 11/1992 | Ghosh et al. | 358/261.3 |
| 5,204,756 A | | 4/1993 | Chevion et al. | 358/426 |
| 5,267,333 A | * | 11/1993 | Aono et al. | 382/166 |
| 5,293,579 A | * | 3/1994 | Stockholm | 382/269 |
| 5,363,205 A | | 11/1994 | Shou et al. | 358/429 |
| 5,471,248 A | * | 11/1995 | Bhargava et al. | 348/420 |
| 5,650,858 A | * | 7/1997 | Lund | 358/455 |

OTHER PUBLICATIONS

Dipen Moitra; TIC Micrographics Section; "Finding a Minimal Cover for Binary Images: an Optimal parallel Algorithm"; pp. 1–34.

James D. Murray and William vanRyper; Encyclopedia of Graphics File Formats; "Data Compressions"; pp. 124–171.

* cited by examiner

Primary Examiner—Amelia M. Au
Assistant Examiner—Tim Johnson
(74) Attorney, Agent, or Firm—Duane C. Basch

(57) ABSTRACT

The present invention is a method and apparatus for the lossless precompression and de-precompression of high resolution binary images that are to be stored or transmitted. More specifically, the present invention employs an area-based precompression/de-precompression technique that is particularly appropriate for high resolution bit replicated images. The technique searches for regularly sized image regions of a common color or binary state and represents the areas in a coded fashion. The compression technique employed by the present invention enables high resolution images to be compressed and stored or transmitted at an image size approximating the size of an image typically obtained by lossless compression of the original bitmap binary image from which the high resolution image was generated.

3 Claims, 12 Drawing Sheets

METHOD AND APPARATUS FOR LOSSLESS PRECOMPRESSION OF BINARY IMAGES

This invention relates generally to compression of binary images, and more particularly to the lossless precompression of binary images that are to be stored or transmitted at high resolutions.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY OF THE INVENTION

The present invention is related to the lossless precompression of binary images that are to be stored or transmitted at high resolutions. More specifically, the present invention employs an area-based compression technique that is appropriate for high resolution bit replicated images. The technique searches for regularly sized image regions of a common color and represents the areas in a coded fashion. The compression technique employed by the present invention enables high resolution images to be compressed and stored or transmitted at an image size approximating the size of an image typically obtained by lossless compression of the original bitmap binary image from which the high resolution image was generated. While most applicable to binary images, the technique can be applied to multiple bit per pixel gray scale images by treating each plane of individual bits as a binary image.

In many digital printing architectures (including printers, copiers, and multifunction machines) it is necessary to store precollated images in memory so that such images may be accessed and printed at a high bandwidth. This is opposed to the well-known practice of composing/collating the image "on-the-fly" which tends to result in slower printing speeds or the need for higher-speed hardware. However, there are drawbacks associated with the storage of image bitmaps in memory, hereafter referred to as electronic precollation memory (EPC). The primary drawback is that the size of the memory must be significant in order to store even moderate resolution images. For example, a full page binary image bitmap at 300 spots per inch (spi) requires approximately 1.05 megabytes (MB) of memory. The problem is only exacerbated by higher resolution printers. A 1200 spi printer will require approximately 16.83 MB to store the same image at the higher resolution. Thus, it is apparent that as the resolution of digital printers increases, there is an ever-growing need for improved compression techniques to reduce precollation memory requirements.

Heretofore, a number of patents and publications have disclosed compression techniques, the relevant portions of which may be briefly summarized as follows:

U.S. Pat. No. 5,144,682 to Nakamura, issued Sep. 1, 1992, discloses a method and apparatus for isolating an area corresponding to a character or word. Included therein is a compression treatment section for compressing the data of the original manuscript in a direction corresponding to that of the manuscript's character line and a compressed image buffer (a ring buffer) for storing the image data. The compression section performs an OR logic operation to accomplish proportional compression. Also described are thresholding and thinning compression methods. The area of connected picture elements is determined by a contour following operation (col. 4–5 & FIG. 4). A rectangular area having an apex of the minimum main and subscanning addresses and another opposing apex of the maximum main and subscanning addresses is then extracted. However, this area is merely a representation of an area within the compressed image (col. 6, lines 1–7).

U.S. Pat. No. 5,204,756 to Chevion et al., issued Apr. 20, 1993, teaches a method for the compression and decompression of binary images. The invention accomplishes variable compression ratios through the use of lossy and lossless compression techniques, selected based upon an evaluation of the binary image at hand. After evaluating the image by dividing it into mutually exclusive segments (e.g., image or text segments), a raster-based compression technique is selected based upon the type of the image segment. The selection (determined by a compression ratio) is further influenced by a metric characterized as the relative widths of black or white intervals in the original text image.

U.S. Pat. No. 5,363,205 to Shou et al., issued Nov. 8, 1994, teaches an image compression method which successively diminishes in size the image to form a compressed image. In particular, a gray scale image is successively reduced by representing a 2×2 convolution by a pixel of its mean density.

J. Murray & W. vanRyper, in "Encyclopedia of Graphic File Formats," O'Reilly & Assoc., July 1994, pp. 125–171 describe details of various publicly known data compression schemes. The publication is hereby incorporated by reference for its teachings relating to compression terminology and compression schemes.

D. Moitra, in "Finding a Minimal Cover for Binary Images: An Optimal Parallel Algorithm," published Nov. 1, 1988 (Cornell University, Computer Science Department), teaches an algorithm for determining a minimal set of maximal squares to cover a binary image. The minimal set of black subsquares is intended to cover the black regions of the image using a set of overlapping squares. Described further is a cover graph which compactly represents the covering relationships between the squares.

SUMMARY OF THE INVENTION

In accordance with the present invention, there is provided a method, operating in an image processing system, for compressing a binary input image where the binary input image is represented as a regular array of binary image signals, comprising the steps of:

identifying an orthogonally shaped, two-dimensional region of binary image signals having a common state;

determining the size of the orthogonally shaped region;

encoding the state and size of the orthogonally shaped region as a digital data word;

storing the digital data word representing the encoded shape and size in compression memory; and repeating the above steps for each of a plurality of orthogonally shaped regions of binary image signals present within the binary input image.

In accordance with another aspect of the present invention, there is provided an image processing system, comprising:

image data memory for storing binary image signals;

a processor, operating in response to a set of preprogrammed instructions, for identifying an orthogonally shaped, two-dimensional region of binary image signals having a common state, said processor further determining the size of the orthogonally shaped, two-dimensional region, encoding the state and size of the orthogonally shaped region as a digital data word, and outputting the encoded digital data word;

a lossless data compressor, responsive to the digital data word output by the processor, for applying lossless compression to the digital data word to produce compressed data therefrom; and precollation memory for storing the compressed data produced by the lossless data compressor.

In accordance with yet another aspect of the present invention, there is provided a method, operating in an image processing system, for compressing a binary input image where the binary input image is represented as a regular array of binary image signals, comprising the steps of:

(a) identifying an orthogonally shaped, two-dimensional region of binary image signals having a common state;

(b) determining the size of the orthogonally shaped region;

(c) encoding the state and size of the orthogonally shaped region as a digital data word;

(d) storing the digital data word representing the encoded shape and size in compression memory;

(e) repeating the above steps for each of a plurality of orthogonally shaped regions of binary image signals present within the binary input image to produce a precompressed image; and (f) losslessly compressing the precompressed image to produce a compressed image.

One aspect of the invention deals with a basic problem in image processing, that of storing and transmitting images. This problem has been recognized and various compression techniques have been employed. However, such techniques are typically raster-based.

This aspect is further based on the discovery of a technique that removes constraints associated with raster-based techniques. The technique employed herein is two-dimensional, dividing the high resolution image into orthogonal blocks of a common color or binary state and then encoding the image information by recording the image as a series of data words having N bits (where N is a power of 2), each word containing bits to represent the color/state and size of the orthogonal blocks.

The technique described herein is advantageous because when compared to other approaches and the technique makes it largely unnecessary to employ a large precollation memory in an image processing system, for example a system associated with a digital printer. In addition, it can be used to compress images prior to transmission thereof. The precompression and de-precompression techniques of the invention are advantageous because they permit efficient compression and decompression of bitmap images. In addition, the techniques that form the basis of this invention can be used in combination with other lossless compression techniques to further improve the compression ratios achieved by the invention. As a result of the invention, it is possible to reduce the size or precollation memory in a digital printer, or to increase the number of images stored therein.

DESCRIPTION OF THE PREFERRED EMBODIMENT

Figure 1:
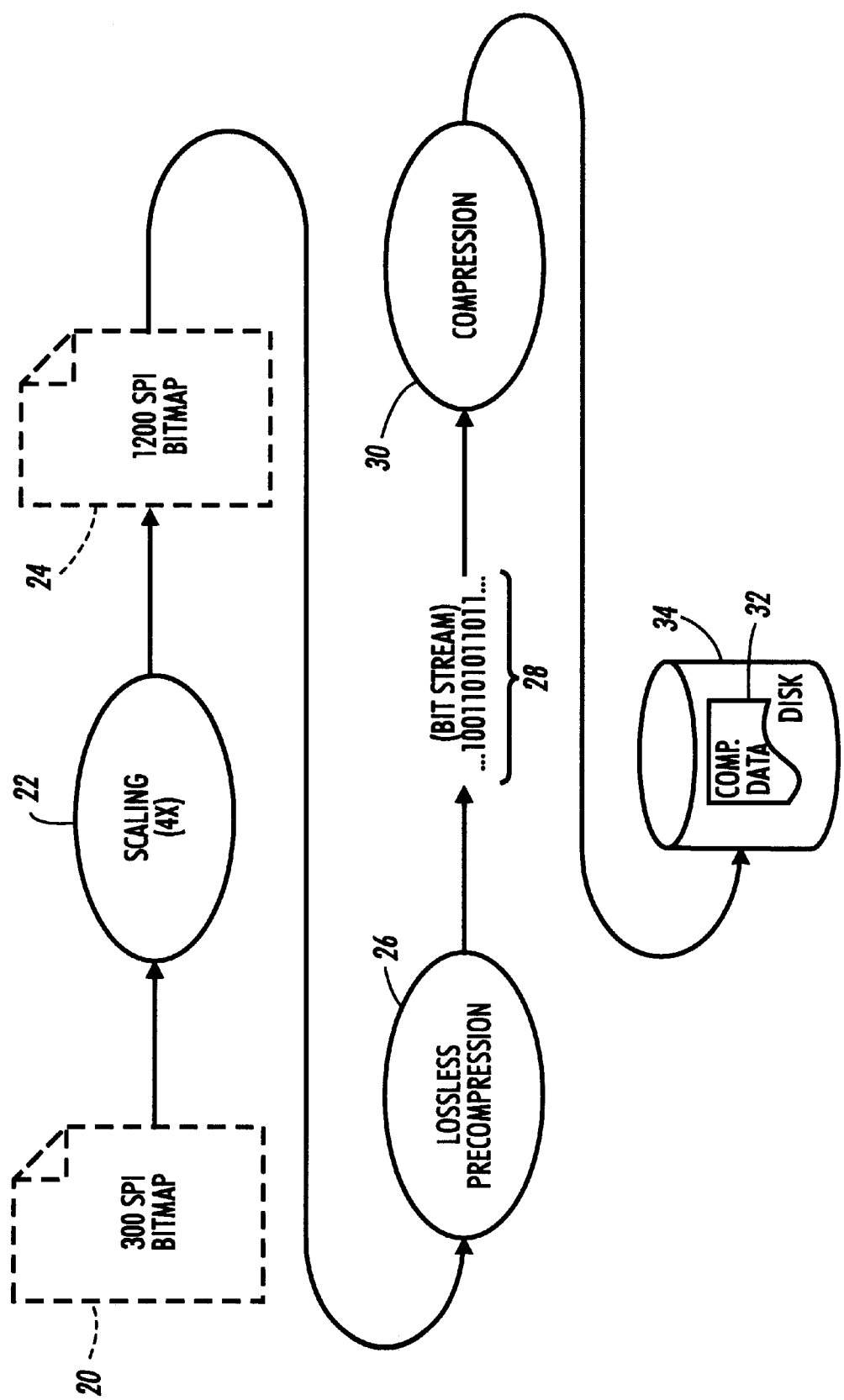
FIG. 1 is a data flow diagram generally illustrating the operations performed in accordance with the precollation of an image, including the precompression aspects of the present invention.

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low" or "black" and "white." A bit is an "inverse" of another bit if the two bits have different values. An N-bit item of data has one of $2^N$ values. A "multi-bit" item of data is an item of data that includes more than one bit.

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be a storage medium.

A "storage medium access device" is a device that includes circuitry that can access data on a data storage medium. Examples include drives for reading magnetic and optical data storage media.

"Memory circuitry" or "memory" is any circuitry that can store data, and may include local and remote memory and input/output devices. Examples include semiconductor ROMs, RAMs, and storage medium access devices with data storage media that they can access. A "memory cell" is memory circuitry that can store a single unit of data, such as a bit or other n-ary digit or an analog value.

A "data transmission medium" or "transmission medium" is a physical medium that transmits data from one location to another.

A "data processing system" is a physical system that processes data. A "data processor" or "processor" is any component or system that can process data, and may include one or more central processing units or other processing components. A processor performs an operation or a function "automatically" when it performs the operation or function independent of concurrent human control. A "processing unit" is a processor that is a component within another processor.

An "instruction" is an item of data that a processor can use to determine its own operation. "Code" means data indicating instructions, but in a form that a processor can execute. A processor "executes" a set of instructions when it uses the instructions to determine its operations.

To "obtain" or "produce" or "determine" an item of data is to perform any combination of operations that begins without the item of data and that results in the item of data. An item of data can be "obtained" or "produced" or "determined" by any operations that result in the item of data. An item of data can be "obtained from" or "produced from" or "determined from" other items of data by operations that obtain or produce the item of data using the other items of data.

A signal "indicates" or "selects" one of a set of alternatives if the signal causes the indicated one of the set of alternatives to occur. For example, a signal can indicate one bit set in a sequence of bit sets to be used in an operation, in which case the signal causes the indicated bit set to be used in the operation.

Any two components are "connected" when there is a combination of circuitry that can transfer signals from one of the components to the other. For example, two components are "connected" by any combination of connections between them that permits transfer of signals from one of the components to the other.

A processor "accesses" an item of data in memory by any operation that retrieves or modifies the item, such as by reading or writing a location in memory that includes the item. A processor can be "connected for accessing" an item of data by any combination of connections with local or remote memory or input/output devices that permits the processor to access the item.

A "data unit" or "unit of data" is an item of data that a processor can access or otherwise operate on as a unit. For example, an eight-bit byte is a data unit in many data processing systems.

A processor or other component of circuitry "operates on" an item of data by performing an operation that includes obtaining a resulting item of data that depends on the item of data operated on. For example, the resulting item of data could result from an operation that accesses the item of data operated on or from a logic or arithmetic operation on the item of data operated on.

An "operand" is an item of data on which an operation is performed.

An operation is performed "using an operand" when the operation is performed on the operand.

An "arithmetic operation" is an operation that obtains a numerical result that depends on the value of an operand. Addition, subtraction, multiplication, and division are examples of arithmetic operations.

A "logic operation" is an operation that obtains one bit using each bit of an operand independent of values of other bits of the operand. NOT is an example of a logic operation that uses one operand. OR, AND, and XOR are examples that use two or more operands. Some arithmetic operations can be efficiently implemented using logic operations, but others include carrying, borrowing, or shifting, making such implementation difficult.

A binary number can be represented as a sum of powers of two. Each bit in the binary number indicates presence or absence of a particular power of two in the sum. Therefore, the "most significant bit" or "MSB" of a binary number is the bit that indicates presence or absence of the largest power of two and the "least significant bit" or "LSB" is the bit that indicates presence or absence of the smallest power of two. Conventionally, the bits of a binary number are ordered in sequence from MSB to LSB or vice versa. As used herein, "left" and "leftward" arbitrarily refer to a direction toward an MSB in sequence while "right" and "rightward" arbitrarily refer to a direction toward an LSB in sequence.

An operation "encodes" items of data when performing the operation on the items of data produces different items of data from which the encoded data items can subsequently be recovered. The operation that recovers the encoded data items is "decoding."

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

An "array of data" or "data array" or "array" is a combination of items of data that can be mapped into an array. A "two-dimensional array" is a data array whose items of data can be mapped into an array having two dimensions.

An item of data "defines" an array when it includes information sufficient to obtain or produce the array. For example, an item of data defining an array may include the defined array itself, a compressed or encoded form of the defined array, a pointer to the defined array, a pointer to a part of another array from which the defined array can be obtained, or pointers to a set of smaller arrays from which the defined array can be obtained.

An item of data is produced by "combining" other items of data when logical or numerical operations are performed on the other items of data that yield an item of data of the same type. For example, if the other items of data are simple booleans, the combined item of data is a simple boolean. If the other items of data are numbers, the combined item of data could be a number, produced by adding the other items of data, calculating the mean of the other items of data, selecting one of the other items of data, or a similar operation that produces a number.

An "image" is a pattern of physical light. An image may include characters, words, and text as well as other features such as graphics. Text may be included in a set of one or more images, such as in images of the pages of a document. An image may be divided into "segments," each of which is itself an image. A segment of an image may be of any size up to and including the whole image.

An item of data "defines" an image when the item of data includes sufficient information to produce the image. For example, a two-dimensional array can define all or any part of an image, with each item of data in the array providing a value indicating the color of a respective location of the image.

An item of data "defines" an image set when the item of data includes sufficient information to produce all the images in the set.

A "pixel" is the smallest segment into which an image is divided in a given system. In an array defining an image in which each item of data provides a value, each value indicating the color of a location may be called a "pixel value" or image signal. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An item of data "relates to" part of an image, such as a pixel or a larger segment of the image, when the item of data has a relationship of any kind to the part of the image. For example, the item of data could define the part of the image, as a pixel value defines a pixel; the item of data could be obtained from data defining the part of the image; the item of data could indicate a location of the part of the image; or the item of data could be part of a data array such that, when the data array is mapped onto the image, the item of data maps onto the part of the image.

An operation performs "image processing" when it operates on an item of data that relates to part of an image. A "neighborhood operation" is an image processing operation that uses data relating to one part of an image to obtain data relating to another part of an image. Pixels are "neighbors" or "neighboring" within an image when there are no other pixels between them and they meet an appropriate criterion for neighboring. If the pixels are rectangular and appear in rows and columns, each pixel may have 4 or 8 neighboring pixels, depending upon the criterion used. A set of pixels in an image is "connected" into a "common region" within the image if each pixel has at least one neighboring, adjacent pixel that is in the set and if each pair of pixels in the set have a common pixel state or color.

An "image characteristic" or "characteristic" is a measurable attribute of an image. An operation can "measure" a characteristic by producing data indicating the characteristic using data defining an image. A characteristic is measured "for an image" if the characteristic is measured in a manner that is likely to produce approximately the same result each time it occurs.

An "image input terminal" (IIT) is a device that can receive an image and provide an item of data defining a version of the image. A "scanner" is an image input device that receives an image by a scanning operation, such as by scanning a document.

An "image output terminal" (IOT) is a device that can receive an item of data defining an image and provide the image as output. A "display" is an image output device that provides the output image in human viewable form. The visible pattern presented by a display is a "displayed image" or simply "image."

Referring now to FIG. 1, illustrated in the data flow diagram are various operations associated with the processing of an image prior to printing. In the digital printing embodiment illustrated, a 300 spi (i.e., 300 spi resolution in the main and subscanning directions) binary bitmap image 20 is initially passed to an image scaling operation 22 where it is bitmap replicated or similarly scaled to render the bitmap at the resolution of the IOT on which it will ultimately be produced. For purposes of illustration, the scaling of the described embodiment will be 4×. The output of the scaling operation is, therefore, a high resolution image (higher than the input resolution) depicted as bitmap 24 which is at 1200 spi resolution. It will be appreciated by those skilled in the art that a 1200 spi resolution image may be preferred because of an ability to provide a common integer scaling ratio for lower resolution images (e.g., 240 spi, 300 spi, 400 spi and 600 spi) so that all may be printed, displayed, or processed at the higher resolution. Subsequently, bitmap 24 undergoes a lossless precompression operation 26 in accordance with the present invention, the output thereof being a bit stream 28 represented in the figure as a series or stream of binary signals. The bit stream may then be provided to compression operation 30 to be further compressed in accordance with any one of a number of lossless compression algorithms prior to storage in pre-collation memory (e.g., disk 34), depicted in the figure as a compressed data record 32 stored on disk storage device 34. It will be further appreciated that any memory device of sufficient capacity to store one or more compressed images may be used for the precollation memory.

Figure 2:
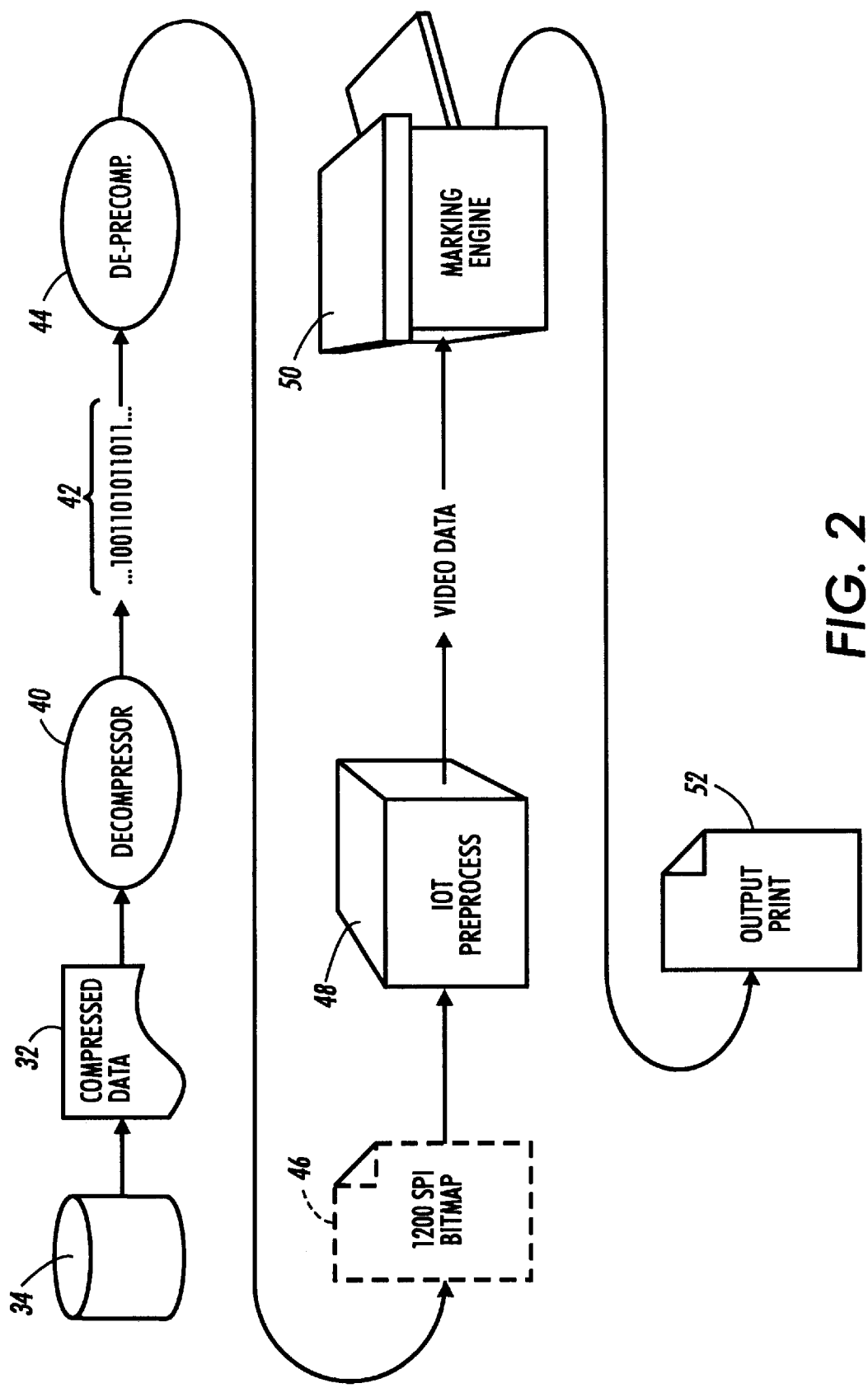
FIG. 2 is a data flow diagram generally illustrating the various operations performed in accordance with the processing of a precollated image, including decompression operations.

Referring next to FIG. 2, illustrated therein is a process for the decompression and printing of the compressed data stored in FIG. 1. In particular, the compressed data 32 is first retrieved from precollation memory 34. Next, a decompression operation 40, operatively designed to decompress in a manner consistent with compression operation 30 of FIG. 1, decompresses the compressed data to produce a binary bit stream 42 in a manner well-known to those skilled in the art of image compression and decompression. Subsequently, bit stream 42 is passed through de-precompression operation 44 where the bit stream signals are interpreted or decoded to reproduce binary image signals representing a bitmap image 46. Bitmap image 46, has a high resolution equal to that of image 24 in FIG. 1 and is an exact replication thereof The bitmap image is then transferred to IOT preprocessor 48 where it is further processed so as to produce video data signals to control a marking engine depicted by reference numeral 50. In response to receiving the video data signals, marking engine 50 produces output print 52 at the high resolution of image 46.

Figure 3:
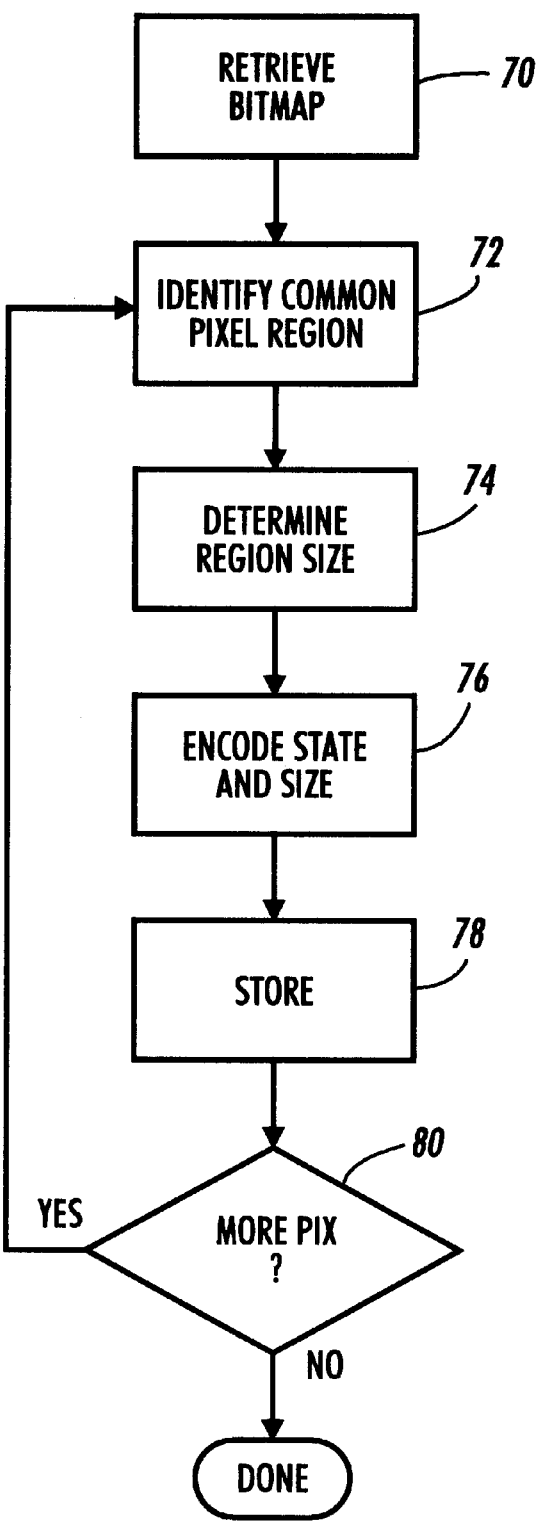
FIG. 3 is a flowchart generally illustrating the steps of the pre-compression operation depicted in FIG. 1.

Having described the general operations of an embodiment of the present invention, attention will now be turned to a description of the various steps associated with the pre-compression operation 26 of FIG. 1. Referring to FIG. 3 and the associated software Appendix beginning on page 16, there is illustrated a flowchart containing the general steps of the precompression operation for a binary image. Although described herein with respect to binary images, the present invention may be applied to multiple bit per pixel gray scale images by treating each plane of individual bits as a binary image. In particular, the precompression operation begins by retrieving the bitmap image signals, step 70. Intrinsic to this operation is the knowledge of the number of pixels per scan line and the number of scan lines (the horizontal and vertical dimensions of the image) associated with the image. This data is normally embedded in an image header or image data set. Some or all of the retrieved image data is preferably stored in a memory buffer for access by a processor during the following steps. For this particular embodiment, an image band buffer of size 128 scan lines is assumed as will be made clear in the following discussion. At step 72, the stored image data is analyzed, beginning at the upper-left corner (pixel 0,0) to identify orthogonal regions of pixels having a common binary state. As used herein, the term orthogonal regions refers to rectangular or square shaped segments of the image, where the boundaries or sides of the segments are aligned along pixel rows or columns within the image. Once an orthogonal region of the image is identified, step 74 operates to determine the size of the region. In particular, step 74 will determine, from a common corner of the region (e.g., the upper-left corner of the orthogonal region) the vertical and horizontal extents of the region. These two values are then employed as the size of the region and, along with the common binary state, are encoded in a data word to represent the orthogonal region at step 76 as described below. It will be recognized that the size of the region may be measured using a number of metrics (e.g., points, pica) but for the preferred embodiment, pixels is employed as the metric. Hence, the horizontal and vertical measures reflect the number of pixels along the pixel rows and columns, respectively. Furthermore, the preferred embodiment illustrated in FIG. 4 employs squares to represent the orthogonal regions so as to further optimize the compression ratio achieved by the pre-compression operation. It is also noted that in a bit replicated, high resolution image, for example an image prepared by bit doubling, a plurality of square regions of a common binary state are automatically created.

Figure 4:
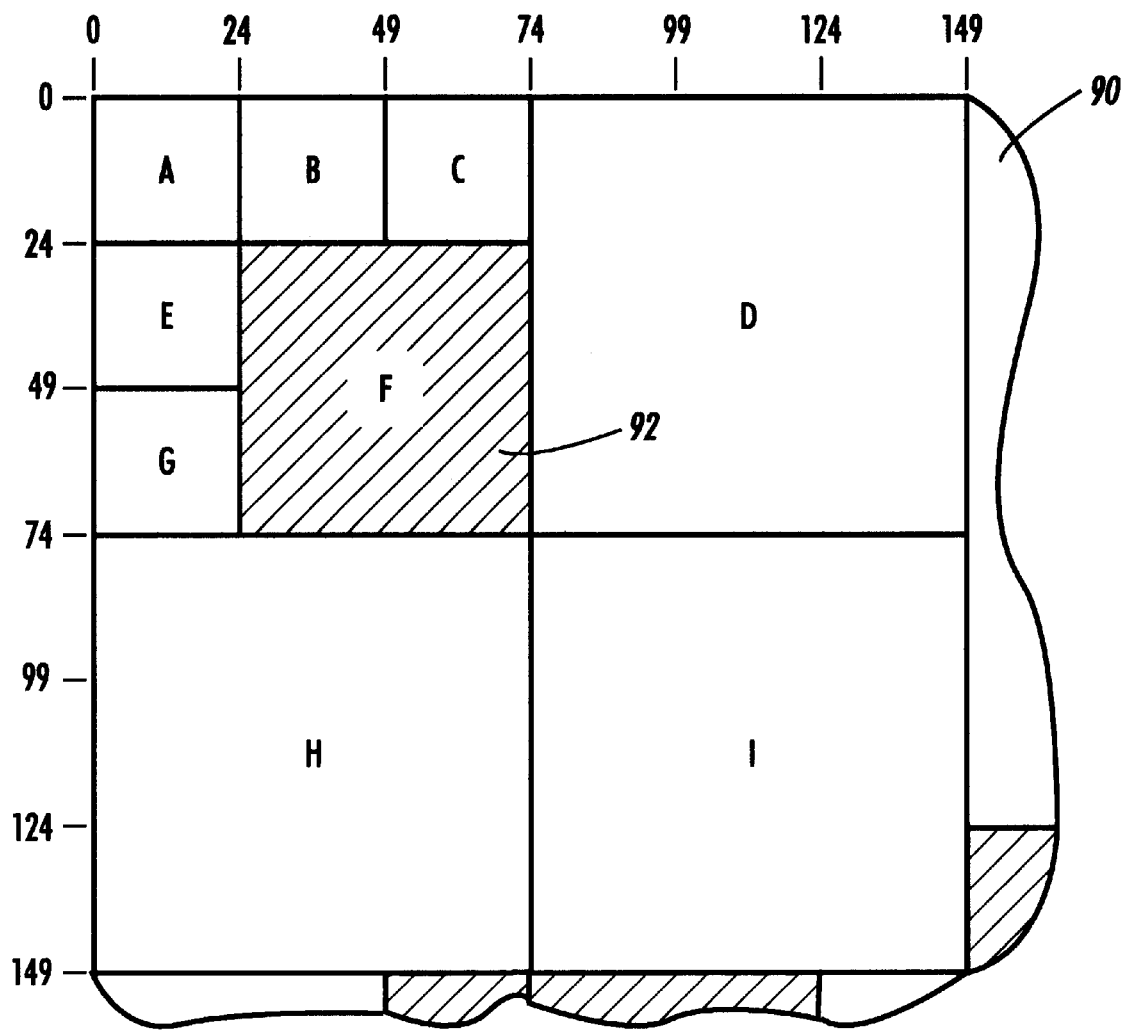
FIG. 4 depicts an exemplary image segment divided into orthogonal regions in accordance with one aspect of the present invention.

Referring briefly to FIG. 4, depicted therein is an exemplary image segment 90 that contains a large black pixel region 92 in the upper left corner of a larger image from which the segment has been selected. As illustrated, the segment has been broken into a number of square regions (A-I). In particular, the various regions are determined by step 72 of FIG. 3, in accordance with instructions carried out by a processor. Code suitable for accomplishing the identification of common binary state regions is found in the Appendix at page 19.

Returning to FIG. 3, the encoded data word describing a region is generated in the following format:

MSB | | | | | | | LSB
X $Y_6$ $Y_5$ $Y_4$ $Y_3$ $Y_2$ $Y_1$ $Y_0$ where X represents the common pixel state and the 7-bit value Y indicates the size of the square minus one (Y=size−1). The fact that 7 bits are used to specify the size of the square minus one is the basis for the previous unjustified assumption of a band buffer of 128 scan lines. It will be appreciated that the size of the data word depicted above is only 8-bits, however, there is no intent to limit the size to any particular number of bits. Moreover, the size of the data word is dependent upon the hardware implementation employed, where the number of image scanlines or rasters that can be held in an input or output memory buffer will dictate the maximum size of the orthogonal region and, therefore, the size of the data word. Thus, selection of the data word size will be determined by both the hardware system upon which the invention is implemented and the need for additional bits to represent larger regions. It will be further understood that additional measurement data (a second n-bit value) is necessary should the invention be implemented using rectangular-shaped orthogonal regions, or that a larger number of bits would be needed should the size of the squares exceed $2^n$. Once encoded at step 76, the data word is then stored in memory as an entry in a record or list of all such regions. The storage is preferably temporary and will allow for a buffering of the data words while the entire image is undergoing precompression. After storage step 78, a test is executed to determine if any ungrouped pixels remain in the image being precompressed. In particular, this test determines whether the upper left corner of the next orthogonal region exceeds the horizontal and vertical dimensions of the binary input image. As indicated in the Appendix, this "test" may be implemented using a looping operation. If the end of the image in the image band buffer has not been reached, then processing of the next orthogonal region is continued at step 72. Otherwise, the pre-compression is complete for the image contained in the band buffer and the next band buffer of image data is read in for processing. At some point the entire image pre-compression will be complete and the data may then be transferred for further compression as previously described with respect to FIG. 1. Upon completion of step 76, a list of orthogonal regions similar to the following would be generated for the image segment illustrated in FIG. 4, assuming a 7-bit value for Y (and an input buffer capable of storing up to $2^7$ scanlines of data.

| Region | State | Size | Data Word |
|--------|-------|------|-----------|
| A | 0 (white) | 25 × 25 | 00011000 |
| B | 0 | 25 × 25 | 00011000 |
| C | 0 | 25 × 25 | 00011000 |
| D | 0 | 75 × 75 | 01001010 |
| E | 0 | 25 × 25 | 00011000 |
| F | 1 | 50 × 50 | 10110001 |
| G | 0 | 25 × 25 | 00011000 |
| H | 0 | 75 × 75 | 01001010 |
| I | 0 | 75 × 75 | 01001010 |

As was previously indicated, the resulting list is comprised of data words having a predetermined number of bits. The list, as illustrated above, will be ordered so as to represent the orthogonal regions in the order, preferably left-to-right, top-to-bottom, in which the first pixel in the region is encountered. For example, referring to FIG. 4, although region F appears to the left of region D, region D is placed higher in the list because it has a pixel in the upper-left corner that is part of the first raster or scan line. Once the list has been defined, it can be output as a stream of data word-wise divisible bits for further lossless compression by well-known techniques as though it represented bitmap data.

Figure 5:
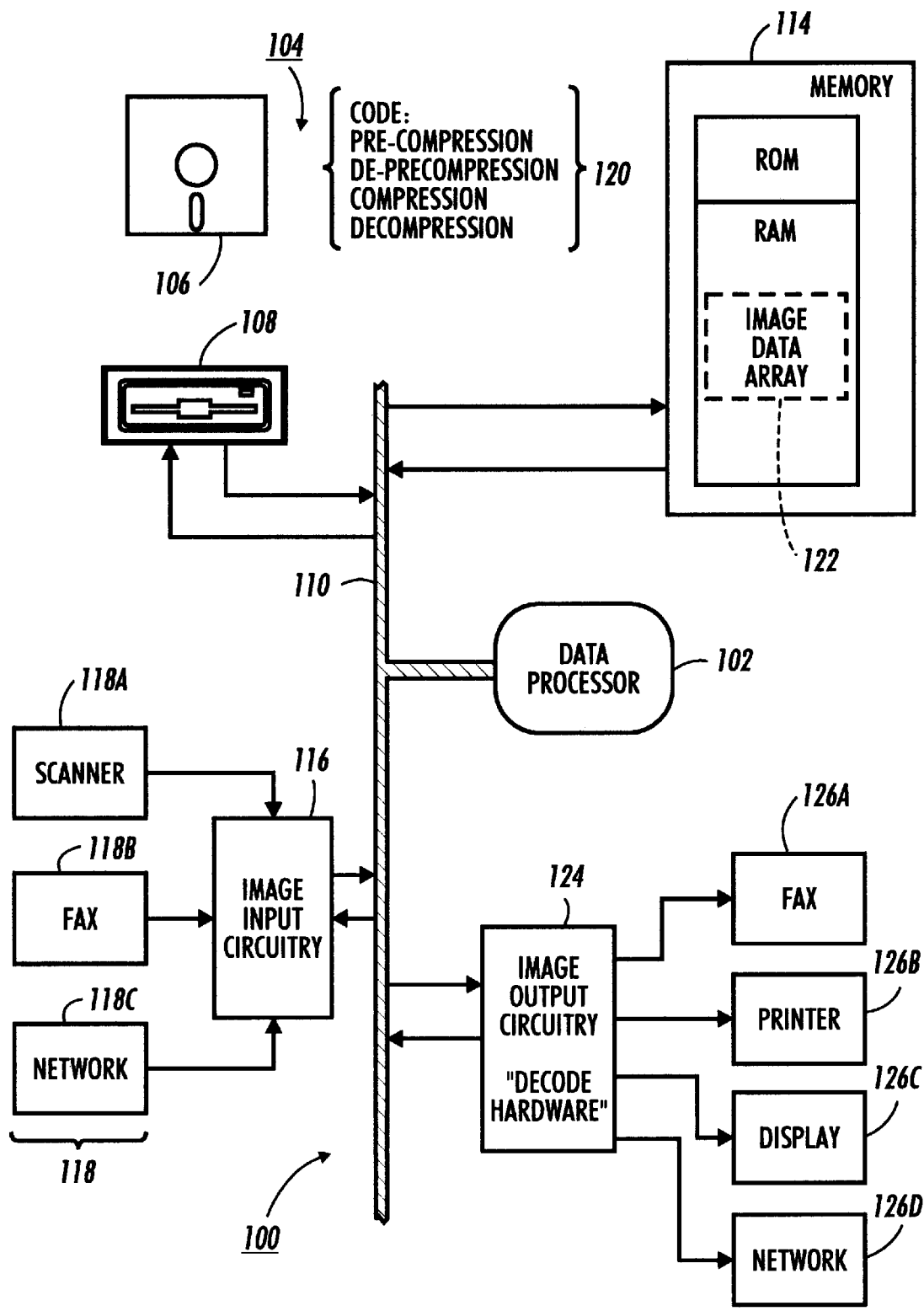
FIG. 5 is a schematic diagram of an exemplary image processing system suitable as an embodiment of the present invention.

Having described by general example the operation of the present invention, attention will now be turned to a description of a data processing system in which the present invention finds particular use. Referring to FIG. 5, displayed therein is an image processing system 100 that is based around a data processor 102. Data processor 102 may be any device suitable for executing code associated with a software product 104, an article of manufacture that can be used in a system that includes components like those shown in FIG. 5. Software product 104 includes storage medium 106 that can be accessed by access device 108. The storage medium 106 may, for example, be a magnetic medium such as the diskette illustrated, an optical medium such as a CD ROM, or any other appropriate medium for storing data. Storage medium 106 stores data that access device 108 can provide to data processor 102 via a bus 110 or similar connection. Processor 102 is connected for accessing memory 114, which can include program memory (ROM and RAM) storing data indicating instructions that processor 102 can execute and also data or precollation memory (RAM) storing data that processor 102 can access in executing the instructions.

Processor 102 is also connected for receiving data defining images from image input circuitry 116 which connects image input terminal (IIT) 118 to processor 102 via bus 110. The page image data could be obtained from scanner 118a, from facsimile (fax) machine 118b, from network 118c, which could be a local area network or other network capable of transmitting data defining an image or from other interactive imaging devices. In addition to storage medium 106, software product 104 includes code instructions 120, which processor 102 can execute to perform operations such as those depicted in FIGS. 3 and 4 and the accompanying software Appendix. In executing instructions 120, processor 102 employs image data from image input circuitry 116 for pre-compression and compression as has been described. Image data 122 may be received from the IIT and stored as array data in precollation memory 114. In addition, array data 122 could be obtained by operating on data defining an input image received from the IIT, and more than a single array of data (122) may be maintained in memory 114 at any particular instant in time. Processor 102 uses the image data to produce a bitstream of lossless, pre-compressed image signals for subsequent compression.

Figure 11:
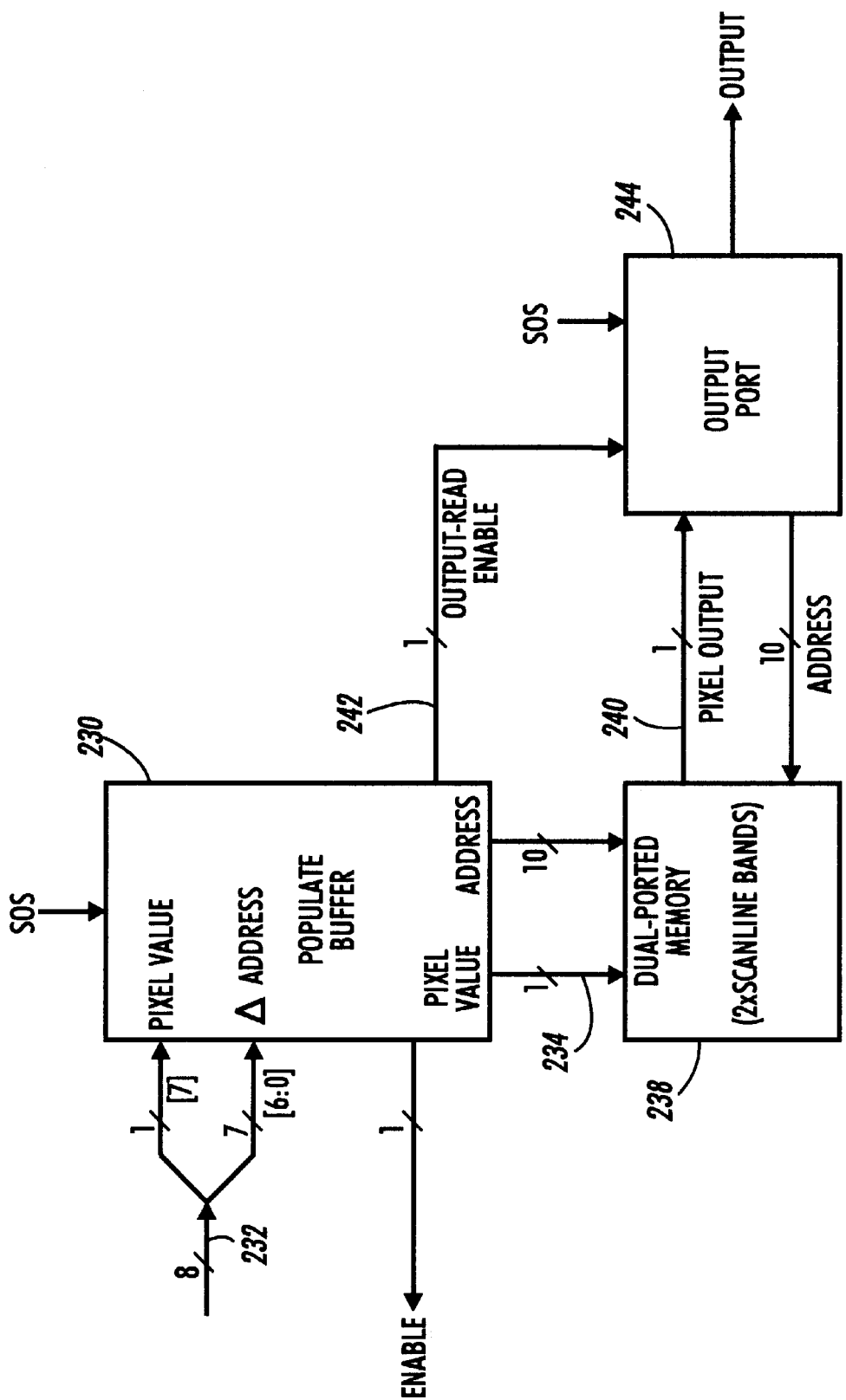
FIG. 11 is a schematic block diagram of a hardware circuit for accomplishing the de-precompression operations illustrated in FIG. 10.

Processor 102 can also be connected for providing data defining images to image output circuitry 124. For example, software product 104 could include data indicating instructions that processor 102 can execute to decompress previously pre-compressed image data defining an output image or, as will be described hereafter, to control the operation of de-precompression hardware such as illustrated in FIG. 11. The output image data obtained as a result of a decompression/de-precompression operation could be provided to image output circuitry 124, and could in turn be provided to fax machine 126a, to printer 126b, to display 126c, or to network 126d to produce images as depicted, for example, in FIG. 5.

Figure 6:
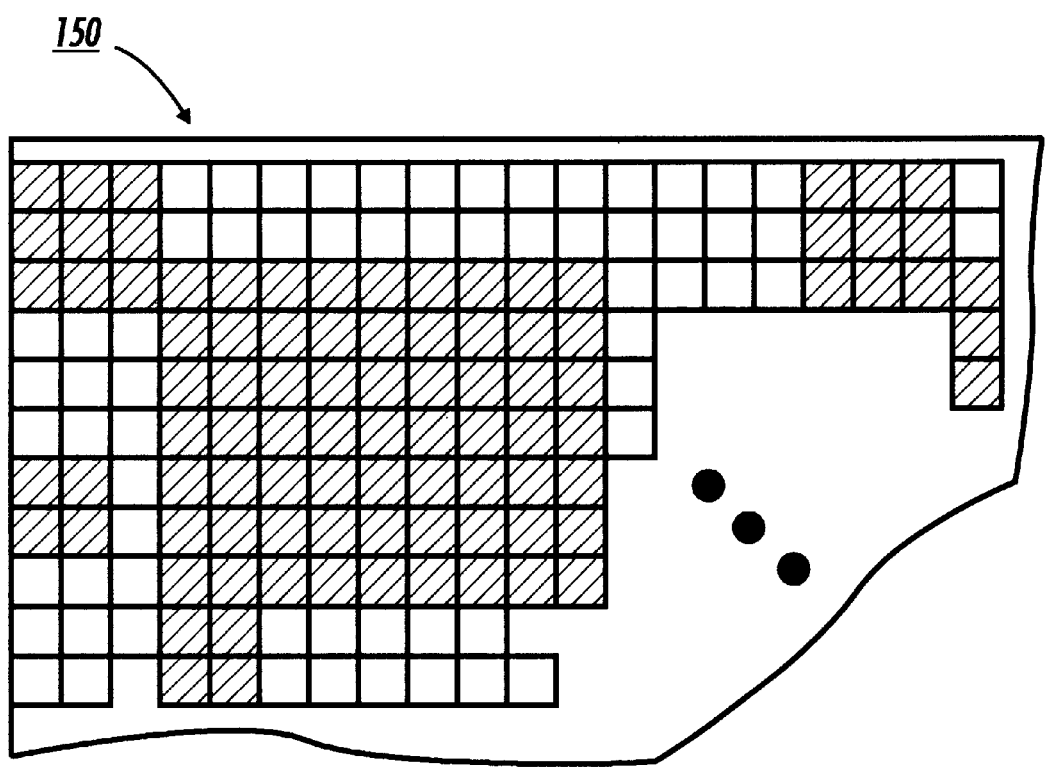
FIG. 6 is a pictorial representation of a segment of a binary bitmap image.
Figure 7:
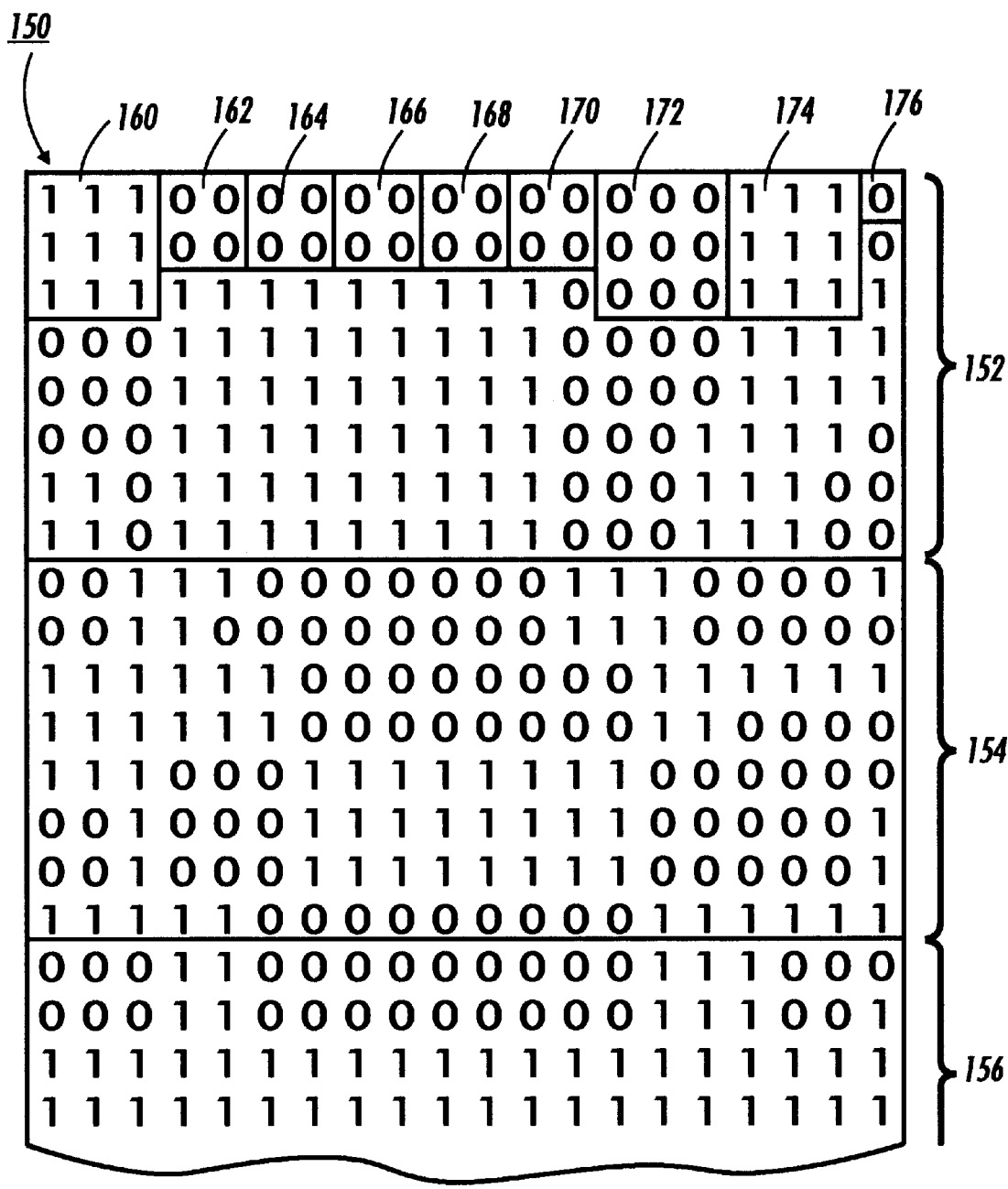
FIGS. 7 and 8 are representations of the binary image data in various stages of processing in accordance with the present invention.
Figure 8:
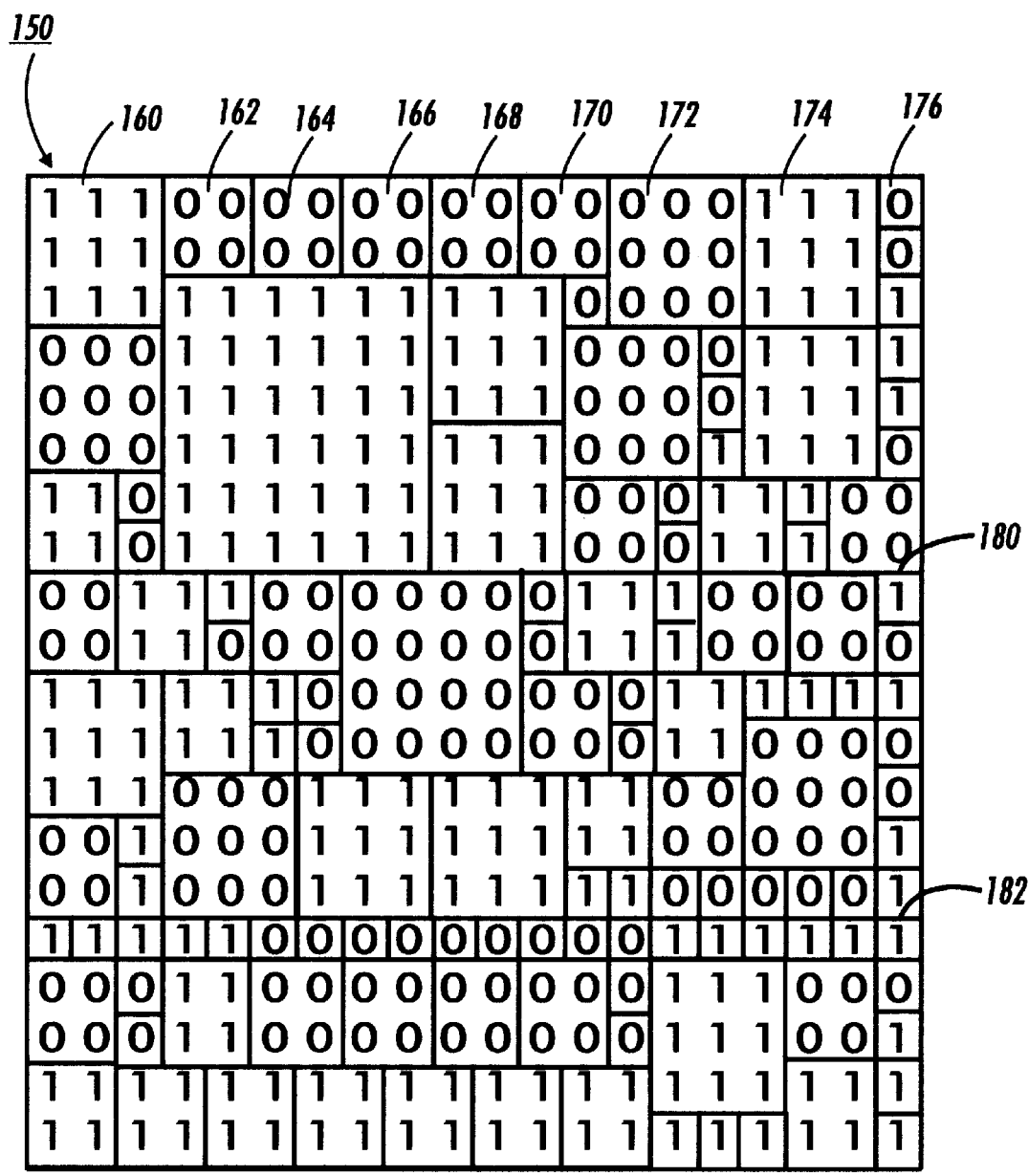

Referring now to FIGS. 6, 7 and 8, the precompression operations described above will be illustrated in an exemplary fashion with respect to the pre-compression of the binary image segment illustrated in an exaggerated fashion in FIG. 6. In particular, FIG. 6 illustrates pictorially the bitmap data represented in memory segment 150 of FIG. 7, where a binary "1" is employed to represent a black (shaded) pixel and a binary "0" is employed to represent a white (unmarked) pixel. Assuming an image data (band) buffer capable of storing a maximum of eight scanlines (e.g., $Y_{max}=8=2^3$), the image data stored in memory segment 150 would be broken into two eight-line sections 152, 154 and partial section 156, with each section ultimately containing a total of 8 rasters for processing. Then, starting with the upper left (0,0) pixel in the image, a black pixel, the state of the pixel is noted and all neighboring black pixels are identified to determine the first common pixel region 160. Subsequently, the process is repeated for the remaining pixel data moving in a horizontal direction along at least the first raster, to produce pixel regions 162 through 176. Returning to the first common pixel region, region 160, the encoded representation of the 3×3 region is 10000010b, where the MSB of "1" indicates a black pixel and the seven LSBs "0000010" indicate the size of the square region minus 1. Processing regions 160–178 along the top of image segment 150 results in the following bitstream (arranged as 8-bit data words):

10000010 00000001 00000001 00000001 00000001 00000001 00000010 10000010 00000000.

Figure 9:
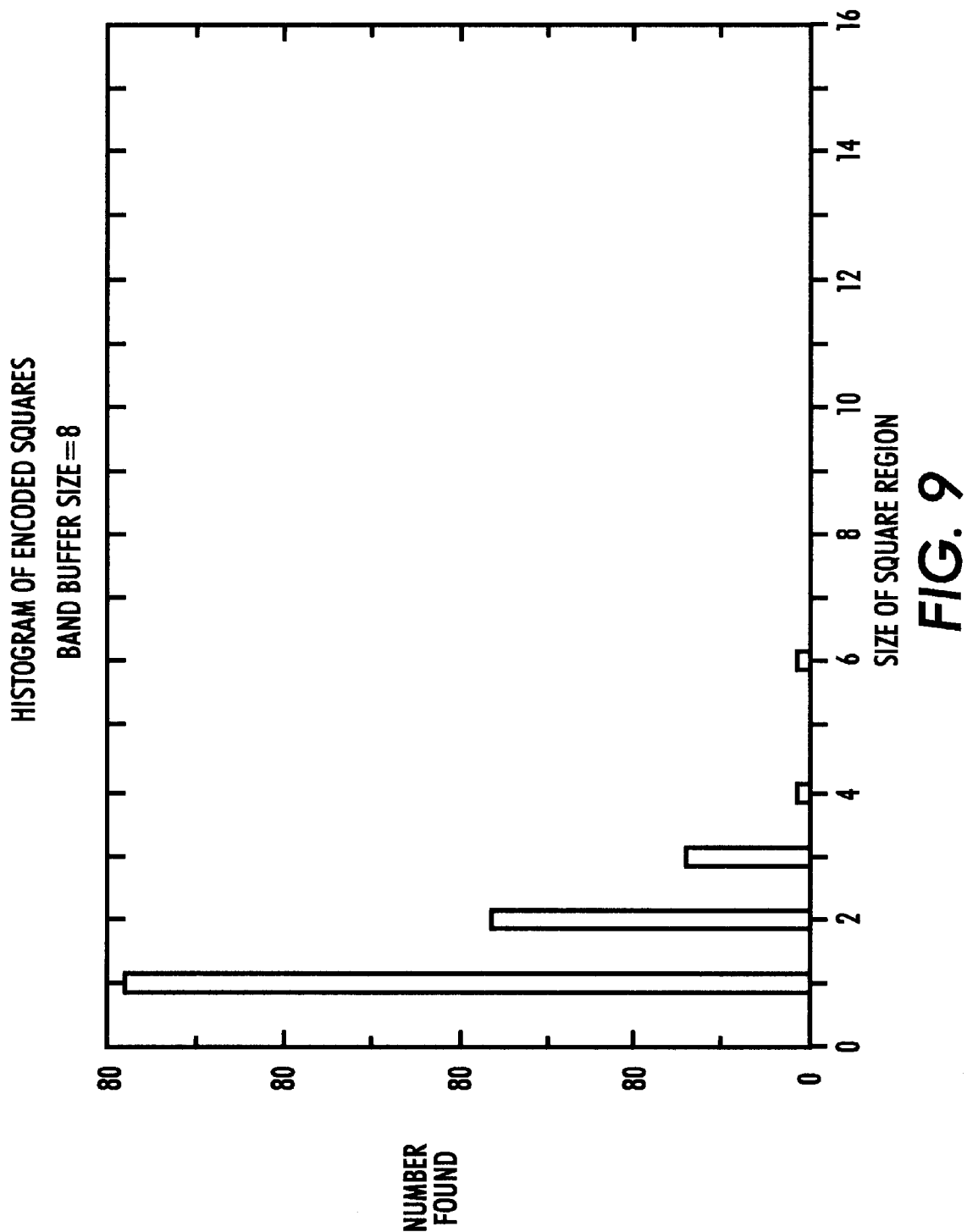
FIG. 9 is a graphical representation of the results of processing the image of FIG. 7 in accordance with the present invention.

Further processing of image segment 150 will result in the identification of the remaining regions as superimposed over the bitmap memory representation of FIG. 8. As will be appreciated, the eight scanline buffer constraint inherently results in natural region boundaries along the two lines 180 and 182. The histogram of FIG. 9 illustrates the relative frequency of region sizes identified in accordance with the example and the pre-compression aspect of the present invention, where the input buffer size is limited to eight scanlines. In addition, the following data is relevant to illustrate the amount of compression that may be achieved in accordance with the pre-compression operations. In particular, the data has been prepared for the exemplary 20×20 image segment depicted in FIGS. 6–8.

TABLE 1

|  | Uncompressed (bytes) | Compressed (bytes) |
| --- | --- | --- |
| Binary Packed File - 20 × 20 | 2098 | 160 |
| Precompression Output File (Band Buffer Size = 8 lines) | 2178 | 179 |
| Precompression Output File (Band Buffer Size = 32 lines) | 2163 | 176 |
| Bit Doubled & Binary Packed File - 40 × 40 | 2248 | 226 |
| Bit Doubled Precompression Output File (Band Buffer Size = 8 lines) | 2202 | 186 |
| Bit Doubled Precompression Output File (Band Buffer Size = 32 lines) | 2178 | 179 |

Note that the byte figures quoted in the above table include a common 2048 byte header of image data. For example, for the Binary Packed File—20×20, the value 2098 is composed of the sum of 2048 plus (20×20)/8=2098 and for the Precompression Output File (Band Buffer Size=8 lines), the value 2178 is the sum of 2048 plus 130 where 130 is the number of squares found in the example image.

It will be appreciated that a number of techniques or "rules" may be employed to identify the square regions having common pixel states in the band buffer. In particular, the embodiment represented by the software code in the Appendix employs the following column-wise rule, represented as a series of steps.

Square:
(a) move diagonally down and to the right until pixels in the bounding square are different than the first pixel; then
(b) move back diagonally up and to the left such that all pixels enclosed in the bounding square are now the same state as the first pixel; this defines the square set.

Alternatively, a number of other techniques may be employed to identify orthogonal regions having common pixel states, including:

(i) Column-wise:
  (a) move to the right column-wise along the current row of the first pixel as long as each pixel added to the region has the same state as the first pixel;
  (b) when a pixel with a differing state is reached, do not include it in the region, but back up to the last pixel in the row having the same state as the first pixel; then
  (c) move down row-wise along the column until pixels enclosed in the bounded rectangular region defined by the first pixel and the current pixel are not the same as the first pixel; then
  (d) move back up row-wise to the last pixel such that all pixels enclosed in the bounding rectangular region have the same state as the first pixel; this defines the column-wise set.
(ii) Row-wise:
  (a) move downward row-wise along the current column of the first pixel as long as the pixel added has the same state as the first pixel;
  (b) when a pixel with a differing state is reached, do not include it in the set, but back up to the last pixel in the column having the same state as the first pixel; then
  (c) move to the right column-wise along the current row until pixels enclosed in the bounding rectangular region are not the same as the first pixel; then
  (d) move back to the last pixel such that all pixels enclosed in the bounding bounded region defined by the first pixel and the current pixel have the same state as the first pixel; this defines the row-wise set.
(iii) combination of (i) and (ii)
  a bounded region may also be defined as any weighted combination of (i) and
  (ii) as long as it results in a bounded rectangular region having all enclosed pixels of the same state as the first pixel.

Figure 10:
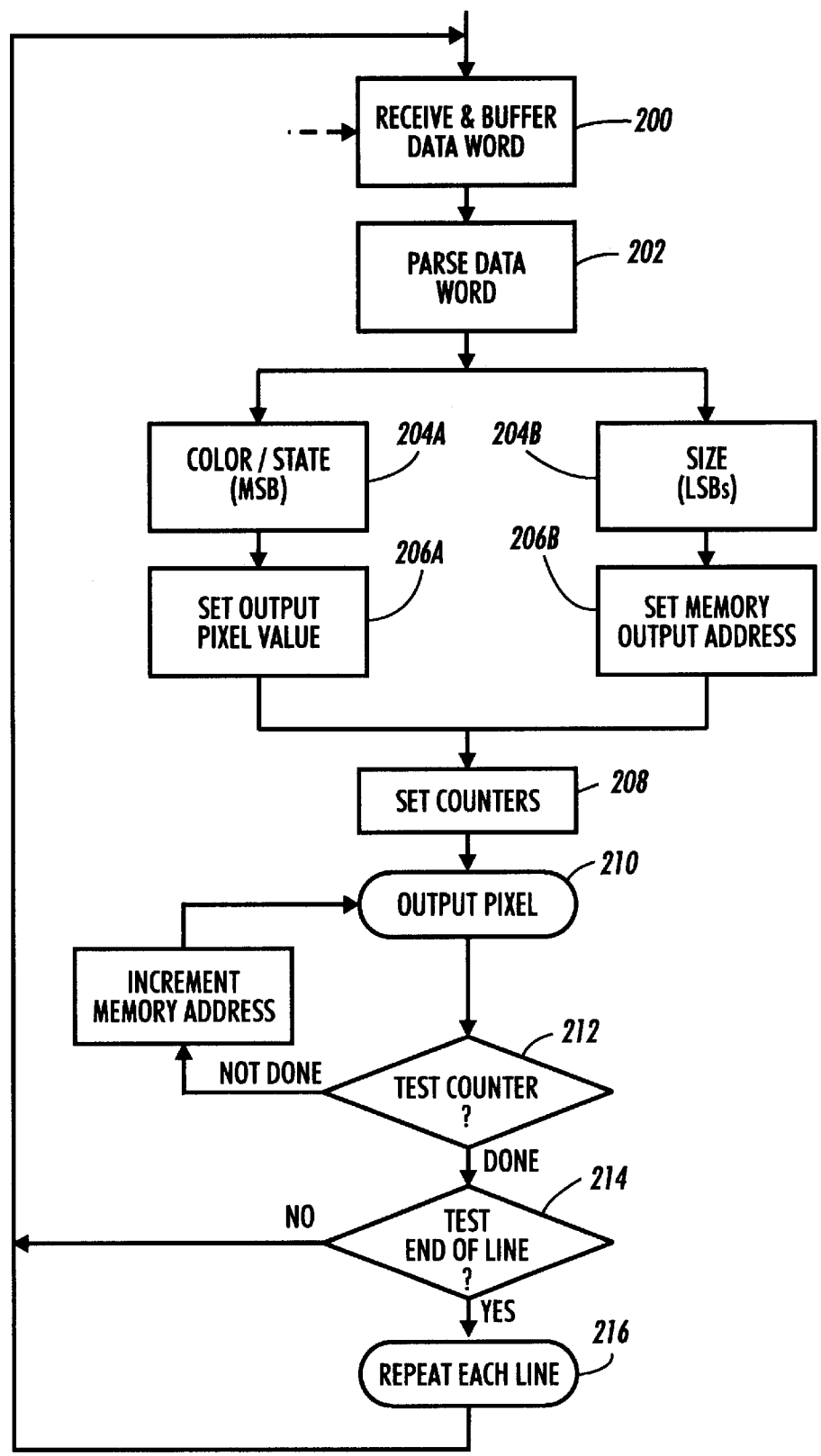
FIG. 10 is a flowchart generally illustrating the steps of the de-precompression operation depicted in FIG. 2.

Having described in detail the pre-compression operations associated with the present invention, attention is now turned to the process of decompressing the precompressed data, referred to herein as de-precompression. Although it will be appreciated that the general steps associated with the de-precompression operation are inherently the reverse of the aforedescribed precompression operation, the steps illustrated in the flowchart of FIG. 10 are preferably accomplished via the hardware embodiment depicted in FIG. 11. Referring to FIG. 10 in conjunction with FIG. 11, the first step assumes that the input data or bit stream received by populate buffer block 230 on line 232 is generated by the lossless decompression operation represented by reference numeral 40 in FIG. 2. Accordingly, step 200 initially receives at least one data word. Subsequently, step 202 parses the data word to determine the pixel state (MSB), step 204a for the common region and the size of the region (LSBs), step 204b (illustrated in FIG. 11 as "Δ address" to reflect the change in addresses). Once determined, the pixel value output by the populate buffer block, line 234, is set for the "width" of the common region, step 206a. Similarly, block 230 also initializes the address into which the pixel value is to be written, step 206b. Once initialized, a programmable count-down counter (not shown) within populate block 230 may be programmed with the width of the common region, step 208. It will be appreciated by those skilled in the art that additional counters may be employed to handle the two-dimensional aspects of the de-precompression process. However, for the sake of simplifying the instant disclosure, such aspects will merely be represented in the form of repeat step 216.

Subsequently, the memory writing process begins by placing the pixel value in at least one of a plurality or memory address, in sequence, step 210, until the counter reaches zero, as determined by step 212. Output memory 238 is preferably a dual ported memory capable of receiving data for storage in an input line 234 while writing data out to an output line 240, so long as the read and write operations do not employ the same address. It will be further recognized that memory 238 may be accessed using one of the well-known block memory transfers enabled by direct memory access devices commercially available. Hence, the requisite number of occurrences of the pixel value may be written to successive memory addresses without further intervention by the processor. Once pixel values have been written for a complete scanline, the end of line is detected and no further pixel value data is written to the first scanline, however, processing may continue for additional scanlines of the first scanline band in the dual ported memory. Note that the output horizontal and vertical dimensions of an image associated with a particular IOT are fixed and known in advance. This allows easy detection of when the end of a scan line is reached. At this point, the output read-enable line 242 is set to indicate to output buffer 244 the presence of valid binary data in the first scanline band of the dual-ported memory. As described herein, the various hardware blocks depicted in FIG. 11 are preferably included as part of the image output circuitry 124 in FIG. 5, or as interface circuitry associated with one of the IOTs depicted therein. Moreover, it will be understood by those skilled in the art that the hardware circuitry described herein further includes various timing and control signals to enable the operation thereof. These signals, being well-known, are not included as part of the description of the preferred embodiment.

Figure 12:
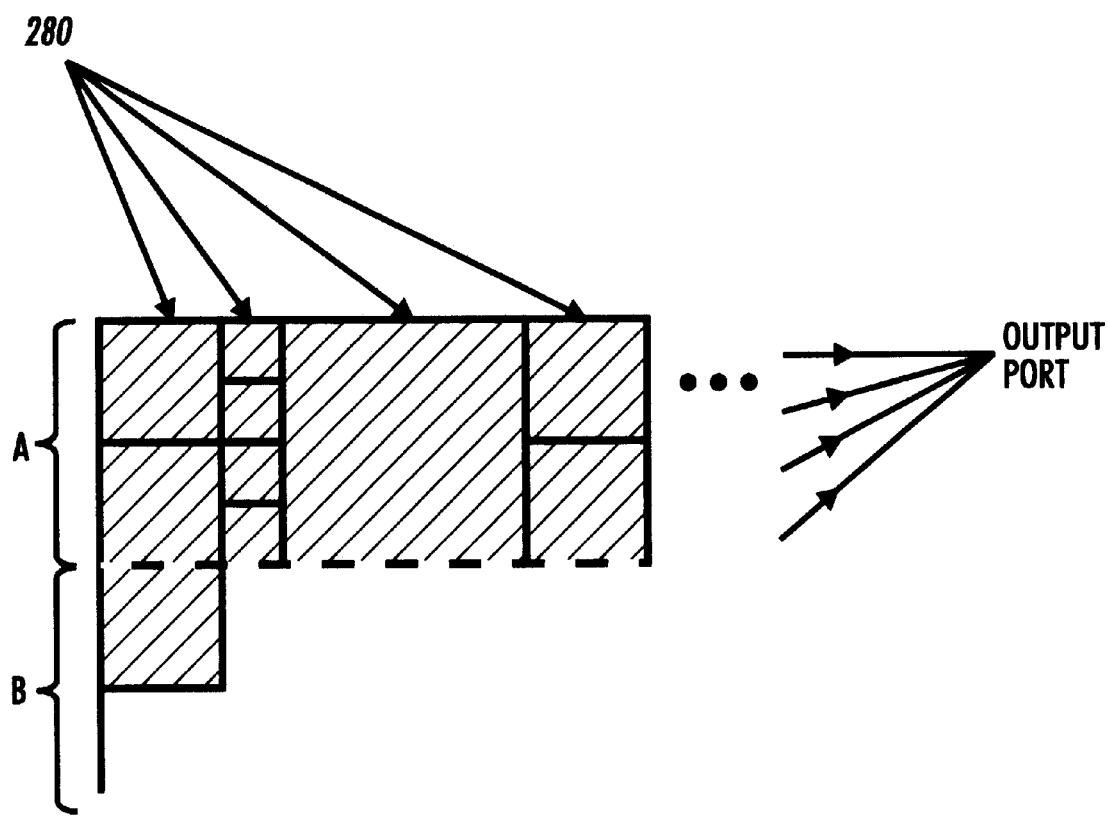
FIG. 12 is an illustration of a portion of the de-precompression data stored in the dual-ported memory band buffer of FIG. 12 during population thereof The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

An example of a portion of the de-precompression operation is illustrated pictorially in FIG. 12. Referring to FIG. 12 and assuming a memory or band buffer (A and B) size of 4 scanlines, each of the common regions 280 would successively be output on a pixel-by-pixel, raster-by-raster basis once the four line band of section A is populated. At the same time, the populate buffer block will begin filling section B. Because there is significantly more data to be transferred out than needs to be received to populate a band section, the populate operation will always be completed before the output/read operation. Accordingly, it is imperative that control logic be provided to regulate the switching between the A and B bands and to "synchronize" the band-buffer limited populate and output operations.

In recapitulation, the present invention is a method and apparatus for the lossless precompression of high resolution binary images that are to be stored or transmitted. More specifically, the present invention employs an area-based precompression/de-precompression technique that is particularly appropriate for high resolution bit replicated images. The technique searches for regularly sized image regions of a common color or binary state and represents the areas in a coded fashion. The compression technique employed by the present invention enables high resolution images to be compressed and stored or transmitted at an image size approximating the size of an image typically obtained by lossless compression of the original bitmap binary image from which the high resolution image was generated.

It is, therefore, apparent that there has been provided, in accordance with the present invention, a method and apparatus for precompressing and de-precompressing binary image data. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

APPENDIX

```
/*                                                   */
/* Cv1.c program                                     */
/* Binary and Bit Replicated image compression       */
/* 10/23/95                                          */
#include <stdio.h>
#include <math.h>
#include <time.h>
#define MAXHEADER 2048
#define WHITE         0
#define GRAY1        85
#define GRAY2       170
#define BLACK       255
#define NLINES       32
FILE *fpi, *fopen( );
int time_now time_then
int verbose = 0;
int verbosep = 0;
main(argc, argv)
int argc;
char *argv[ ];
   {
   char *program;
   char *infile;
   char c;
   int cin;
   char cout;
   int outint;
   char outchar;
   unsigned int np, nsl;
   int header[MAXHEADER];
   int *img, *ind;
   int nlines;
   int band_count;
   int band_limit;
   int i, j, k;
   int jj, kk, n;
   int sum1, sum2;
   int count;
   int stats[128];
/* Process command line arguments */
   time(&time_then);
   if(argc != 4)
      {
      fprintf(stderr, "usage:Cv1 (input AIS file) (#pixels) (# scan lines)\n");
      fprintf(stderr, "Cv1 expects 8 bit/pixel AIS format\n");
      exit(0);
      }
   program = *argv;
   infile = *(argv+1);
   np = atoi(argv[2]);
   nsl = atoi(argv[3]);
/* Open input AIS file */
   if ((fpi = fopen(infile, "r")) == NULL)
      {
      fprintf(stderr, "Cv1: cannot open input AIS file %s\n", *(argv+1));
      exit(1);
      }
/* input and output AIS image file header */
   for(i = 0; i < MAXHEADER; i++)
      {
      cin = getc(fpi);
      cout = cin;
      putc(cout, stdout);
      }
/* Determine band buffer size */
   if(nsl < NLINES)
      {
      nlines = nsl,
      }
   else
      {
      nlines = NLINES,
      }
/* Allocate nlines for AIS image file */
   img = (int *) malloc( (nlines\np)*sizeof(int *) );
```

APPENDIX-continued

```
    if (img == NULL)
       {
       fprintf(stderr, "Cv1: cannot allocate active image band storage\n");
       exit(1);
       }
/* Allocate nlines for image indicator file */
    ind = (int *) malloc( (nlines\np)*sizeof(int *) );
    if (ind == NULL)
       {
       fprintf(stderr, "Cv1: cannot allocate image indicator band storage\n");
       exit(1);
       }
/* Zero out image indicator band */
    for(i= 0; i < nlines; i++)
       {
       for(j = 0; j < np; j++)
          {
          *(ind + i\np + j) = 0;
          }
       }
/* Zero out statistics */
    for(i = 0; i < nlines+1; i++)
       {
       stats[i] = 0;
       }
/* Get first nlines of image */
    for(i = 0; i < nlines; i++)
       {
       for(j = 0; j < np; j++)
          {
          cin = getc(fpi);
          *(img + i\np + j) = cin;
          if(verbosep == 1) fprintf(stderr, "i=%2d j=%2d cin=%3d\n", i, j, cin);
          }
       }
/* Verbose output */
    if (verbose == 1)
       {
       time(&time_now);
       time_then = time_now - time_then;
       fprintf(stderr, "set up time = %10d seconds\n", time_then);
       time_then = time_now;
       }
/* Compute number of band buffers to process */
    band_court = (nsl/NLINES); /* plus a partial buffer */
/* Process image */
    for(i = 0; i < band_count+1; i++) /* Band buffer count */
    {
    for(k = 0; k < nlines; k++) /* Scan line */
       {
       for(j = 0; j < np; j++) /* Pixel */
          {
          /* Start Image Processing */
          if(*(ind + k\np + j) == 0)
          {
          /* set most significant bit value */
          if(*(img + k\np + j) == WHITE)
             {
             outint = 0; /* white */
             }
          else
             {
             outint = 128; /* black */
             }
          /* expand basic square */
          n = 1; /* n = 0 automatically satisfied */
       loop: sum1 = 0;
          sum2 = 0;
          if (k+n == nlines || j+n == np)
             {
             goto output;
             }
          for(kk = k; kk < k+n+1; kk++)
             {
             for(jj = j; jj < j+n+1; jj++)
                {
                if(*(img + kk\np + jj) == WHITE)
                   {
                   count = 0;
```

APPENDIX-continued

```
                }
            else
                {
                count= 1;
                }
            sum1 += count;
            sum2 += *(ind + kk\np + jj);
            if(verbose == 2)
                {
                fprintf(stderr, " kk = %2d jj = %2d sum1 = %4d sum2 = %4d\n", kk, jj, sum1,
sum2);
                }
            }
        }
    /* check for all white pixels */
    if(outint == 0 && sum1 = 0 && sum2 == 0)
        {
        n++;
        goto loop;
        }
    /* check for all black pixels */
    if(outint == 128 && sum1 == (n+1)*(n+1) && sum2 == 0)
        {
        n++;
        goto loop;
        }
    /* output compressed value */
output: outint += n;
    outchar = outint;
    putc(outchar, stdout);
    /* accumulate statistics */
    stats[n]++;
    n--;
    /* check for verbose output */
    *if(verbose == 1)
        {
        time(&time_now);
        time_then = time now - time_then;
        fprintf(stderr, "packed byte output = %6d k = %4d j = %4d\n", outint, k, j);
        fprintf(stderr, "elapsed time = %10d seconds\n", time_then);
        time_then = time_now;
        }
    /* set image indicator buffer */
    for(kk = k; kk < k+n+1; kk++)
        {
        for(jj = j; jj < j+n+1; jj++)
            {
            *(ind + kk\np +jj) = 1;
            }
        }
    }/* end of indicator variable for loop */
    } /* end of J loop */
} /* end of K loop */
    * Read next band buffer */
if(i == (band_count)) break; /* check for all data processed */
if(i < (band_count-1))
    {
    for(kk = 0; kk < nlines; kk++)
        {
        for (jj = 0; jj < np; jj++)
            {
            cin = getc(fpi);
            *(img + kk\np + jj) = cin;
            *(ind + kk\np + jj) = 0;
            if(verbosep == 1) fprintf(stderr, "kk=%2d jj=%2d cin=%3d\n", kk, jj, cin);
            }
        }
    }
else
    {
    band_limit = nsl - ((i+1)\nlines);
    for(kk = 0; kk < nlines; kk++)
        {
        for(jj = 0; jj < np; jj++)
            {
            if(kk < band_limit)
                {
                cin = getc(fpi);
```

APPENDIX-continued

```
        *(img + kk\np + jj) = cin;
        *(ind + kk\np + jj) = 0;
        if(verbosep == 1) fprintf(stderr, "kk=%2d jj=%2d cin=%3d\n", kk, jj, cin);
        }
      else
        {
        *(img + kk\np + jj) = 99;
        *(ind + kk\np + jj) = 1;
        }
       }
      }
     }
   }
} /* end of band buffer count */
/* Output statistics */
fprintf(stderr, "Statistics of Compression\n");
for(i = 1; i < (nlines+1); i++)
   {
   fprintf(stderr, "count [ n = %3d ] = %7d\n", i, stats[i]);
   }
exit(0);
}
```

What is claimed is:

1. A method, operating in an image processing system, for compressing a binary input image where the binary input image is represented as a regular array of binary image signals, comprising the steps of:

identifying an orthogonally shaped, two-dimensional region of binary image signals having the same state and a boundary encompassing the orthogonally shaped region, including the steps of:

identifying a state of a first pixel in the binary input image;

establishing a set consisting of the first pixel;

adding to the set all pixels identified by the steps comprising (a) moving a current pixel position diagonally through the binary input image until pixels in a bounding square defined by the first pixel position and the current pixel position are not the same state as the first pixel; and then (b) moving the current pixel position back diagonally such that all pixels enclosed in the bounding square are the same state as the first pixel to identify the orthogonally shaped, two dimensional region;

determining the size of the orthogonally shaped region;

encoding the state and size of the orthogonally shaped region as a digital data word;

storing the digital data word representing the encoded shape and size in compression memory; and repeating the above steps for each of a plurality of orthogonally shaped regions of binary image signals present within the binary input image, wherein at least one of the plurality of orthogonally shaped regions is generated by non-symmetrical division of a larger image region.

2. A method, operating in an image processing system, for compressing a binary input image where the binary input image is represented as a regular array of binary image signals, comprising the steps of:

identifying an orthogonally shaped, two-dimensional region of binary image signals having the same state and a boundary encompassing the orthogonally shaped region, including the steps of:

identifying a state of a first pixel in the binary input image;

establishing a set consisting of the first pixel;

adding to the set all pixels identified by the steps comprising (a) moving a current pixel position column-wise along a current row of the first pixel so long as each pixel added to the region has the same state as the first pixel;

(b) when a current pixel with a different state is reached, backing up to a previous pixel position in the current row, the previous pixel position having the same state as the first pixel;

(c) moving the current pixel position row-wise until pixels enclosed in a bounded region having diagonal corners defined by the first pixel position and the current pixel position are different than the state of the first pixel; and (d) moving the current pixel position back row-wise to a last current pixel position such that all pixels enclosed in the bounded region are the same state as the first pixel to identify the bounded region as the orthogonally shaped, two dimensional region;

determining the size of the orthogonally shaped region;

encoding the state and size of the orthogonally shaped region as a digital data word;

storing the digital data word representing the encoded shape and size in compression memory; and repeating the above steps for each of a plurality of orthogonally shaped regions of binary image signals present within the binary input image, wherein at least one of the plurality of orthogonally shaped regions is generated by non-symmetrical division of a larger image region.

3. A method, operating in an image processing system, for compressing a binary input image where the binary input image is represented as a regular array of binary image signals, comprising the steps of:

identifying an orthogonally shaped, two-dimensional region of binary image signals having the same state and a boundary encompassing the orthogonally shaped region, including the steps of:

identifying a state of a first pixel in the binary input image;

establishing a set consisting of the first pixel;

adding to the set all pixels identified by the steps comprising (a) moving a current pixel position row-wise along a current column of the first pixel so long as each pixel added to the region has the same state as the first pixel;

(b) when a pixel with a different state is reached, backing up to a previous pixel position in the current column, the previous pixel position having the same state as the first pixel;

(c) moving the current pixel position column-wise along a current row until pixels enclosed in a bounded region having diagonal corners defined by the first pixel position and the current pixel position are different than the state of the first pixel; and (d) moving the current pixel position back column-wise to a last current pixel position such that all pixels enclosed in the bounded region are the same state as the first pixel to identify the bounded region as the orthogonally shaped, two dimensional region;

determining the size of the orthogonally shaped region; encoding the state and size of the orthogonally shaped region as a digital data word; storing the digital data word representing the encoded shape and size in compression memory; and repeating the above steps for each of a plurality of orthogonally shaped regions of binary image signals present within the binary input image, wherein at least one of the plurality of orthogonally shaped regions is generated by non-symmetrical division of a larger image region.

* * * * *